(No Model.)
2 Sheets—Sheet 1.
B. F. DARBY.
CULTIVATOR BLADE.
No. 504,969.
Patented Sept. 12, 1893.
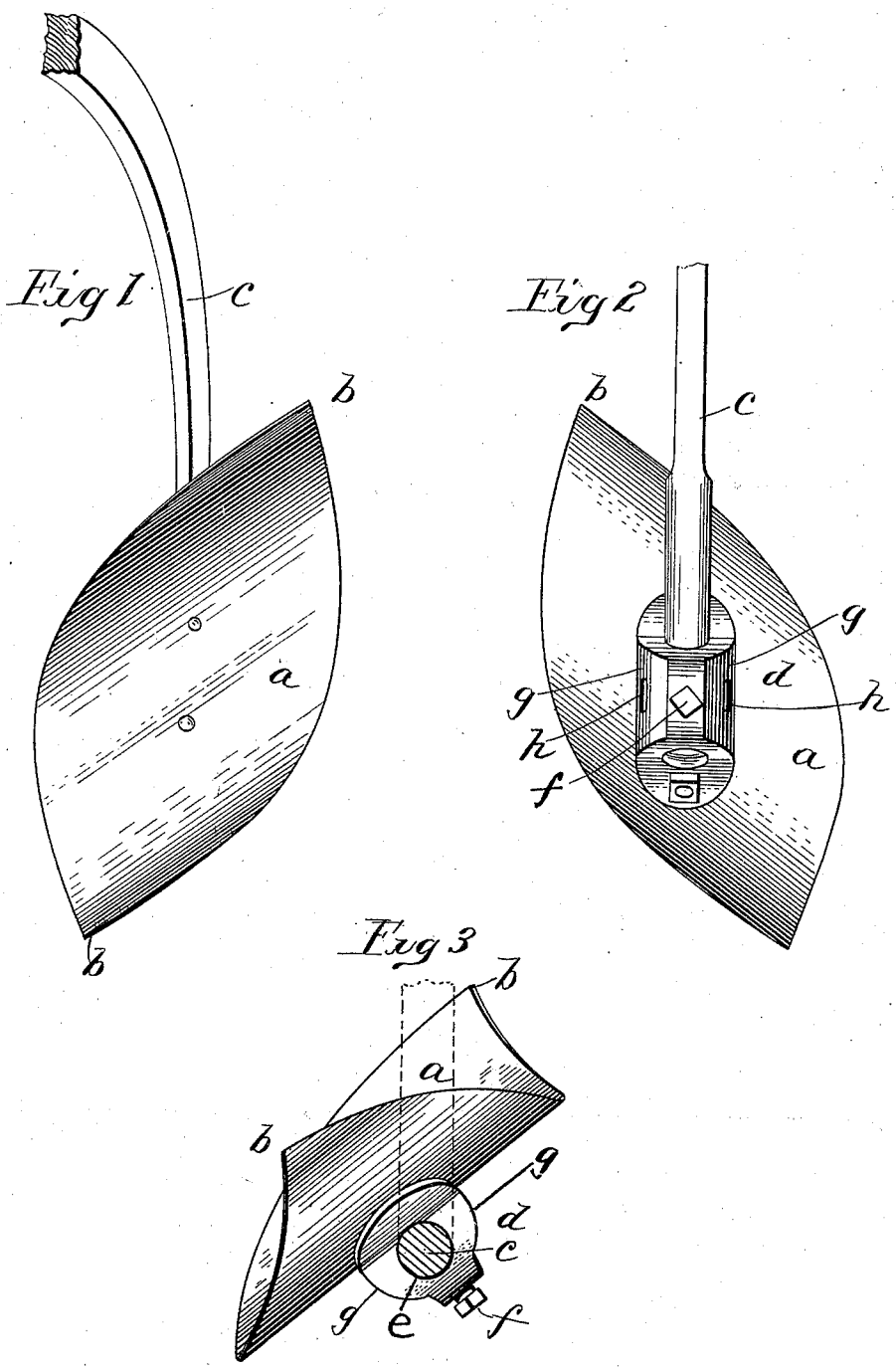
WITNESSES:
Cle Bundine
Hubert E. Peck.
INVENTOR
B. F. Darby
BY O. E. Duffy
ATTORNEY.

(No Model.) 2 Sheets—Sheet 2.
B. F. DARBY.
CULTIVATOR BLADE.
No. 504,969. Patented Sept. 12, 1893.
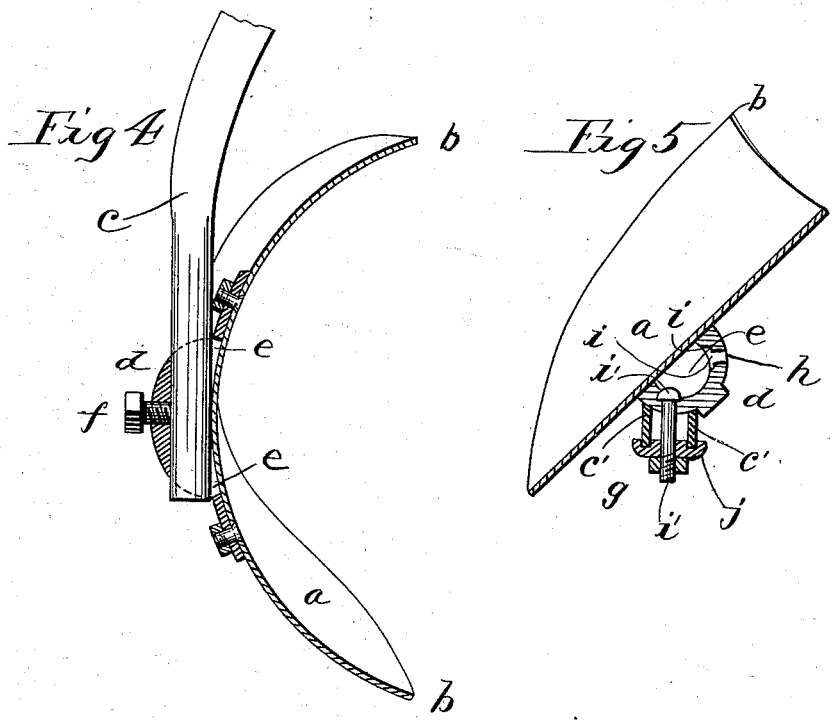
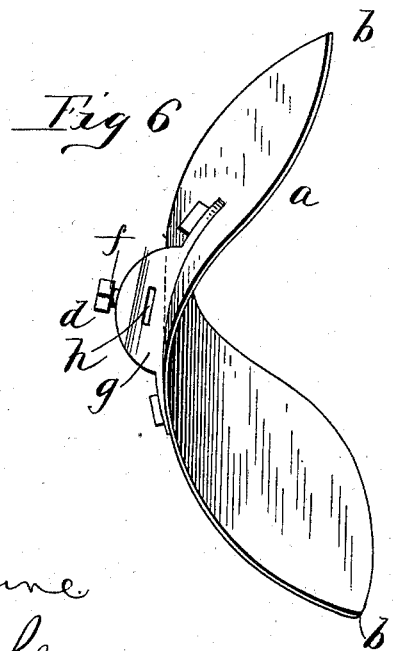
WITNESSES:
INVENTOR
B. F. Darby
BY
ATTORNEY.

UNITED STATES PATENT OFFICE.

BENJAMIN F. DARBY, OF CLAY'S PRAIRIE, ILLINOIS.

CULTIVATOR-BLADE.

SPECIFICATION forming part of Letters Patent No. 504,969, dated September 12, 1893.

Application filed April 28, 1893. Serial No. 472,194. (No model.)

*To all whom it may concern:*

Be it known that I, BENJAMIN F. DARBY, of Clay's Prairie, in the county of Edgar and State of Illinois, have invented certain new and useful Improvements in Cultivator-Blades; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in cultivating blades or shovels.

The object of the invention is to provide an improved cultivating blade, capable of being reversed, and exceedingly efficient in action and which will cultivate the earth with a minimum amount of draft and in an improved and superior manner.

A further object of the invention is to provide improved means for fastening the cultivator blade, so that the blade can be reversed when desired, and can be used with various kinds of shanks.

The invention consists in certain novel features of construction, and in combinations of parts more fully described hereinafter and particularly pointed out in the claims.

Referring to the accompanying drawings,—Figure 1 is a side elevation showing the cultivator blade, looking at the concave side thereof. Fig. 2 is an elevation of the cultivator blade looking at the landside or convex side thereof showing the fastening block or plate together with the shank of the cultivator. Fig. 3 is a top plan view of the cultivator blade showing the angle to the line of draft at which the blade cuts. Fig. 4 is a sectional view showing a round cultivator shank fastened in the securing means or plate. Fig. 5 is a cross sectional view showing a different form of cultivator shank fastened to the plate. Fig. 6 is a detail perspective of the blade.

In the drawings, the reference letter $a$, indicates the cultivator blade. This blade, it should be observed is formed of one piece of metal and is what might be termed concavo-convex in cross section and provided with two points $b\ b$, and with cutting edges for each point so that either point of the blade can be employed in cultivating. The blade if flattened out would be approximately elliptical in form. In operative position and curvature it is in a shape of an elliptical plate that has been twisted, so that the two points project in opposite directions, and the blade itself between the two points, in cross section, will form the segment of a circle. When the blade is properly set for operating the lower part thereof extends or curves downwardly, outwardly and forwardly, while the upper part thereof curves upwardly, outwardly and rearwardly so that the lower front edge which forms the cutting edge, and the earth is carried rearwardly and laterally at the same time. If the blade be reversed the parts will assume the same position, the blade being double ended and alike at both ends.

The shovel or blade when properly set is inclined to the line of draft at an angle of about twenty-five or thirty degrees, and it cuts through the earth like a gouge, as it were, without tearing or shearing from side to side, as is the case where certain forms of shovels or blades are employed, and furthermore the blade is set at such an angle and so constructed that the draft or pressure on opposite sides thereof is equalized, permitting the shovel to run in a perfectly straight line without lateral pressure on either side thereof. This shovel turns the ground or earth over smoothly and completely and without throwing it onto the plant so that no fenders are required. These shovels are usually made in rights and lefts, and they can be arranged in any suitable manner on the cultivator so that the furrows will all be thrown one way, or so that the first furrows will be thrown in one direction, and the rear shovels will turn the furrows back in the other direction. Of course this arrangement forms no part of my invention, and I will not fully describe the same herein.

$d$, indicates the fastening plate or block secured on the rear on convex side of the shovel at the center thereof or midway between the points and parallel with the length of the shovel, that is, with a line drawn through the two points of the shovel. This plate or block is suitably riveted or bolted to the shovel and its under side is curved and twisted as it were to fit the outer convex surface of the shovel. This block is provided with the longitudinal aperture e, extending completely therethrough to receive the end of a pin cultivator shank c, or any form of a cultivator shank having a round end, or an end of such form that it can extend into the opening in the block from either end thereof.

f, indicates a binding screw or any other suitable means to clamp the block in the desired position on the cultivator shank. By this means the cultivator shovel can be placed on the shank on either end thereof, that is, either direction can be easily reversed and clamped in the desired position. The opposite side of the block is transversely rounded or convex, see g g, and provided with central elongated openings h, extending into the central opening of the block, and having the lateral recesses i, projecting from opposite sides of the center of the inner ends of the lateral opening. These openings are intended to receive the heads of T bolts i', which are extended through the elongated openings and then turned so that the heads fit in said recesses, the bolts extending out through slots in what are usually termed "sleeve shanks," see c', and through a grooved block keeper j, resting on the outer side of the shank, the bolt being provided with a nut on the outer side of said keeper. This fastening just mentioned is intended to secure the shovel to cultivator shanks longitudinally slotted at their ends, the shank resting on the rounded edge of the block that is, either rounded edge of the block, and the sides of, the slot resting at the ends of the rounded edge, while the keeper and bolt securely lock, and clamp the block and the shank together. The keeper grooved to receive the upper edges of the shank holds the shank rigidly in position against lateral movement, yet the construction is such that the bolt and nut can be loosened and the blade adjusted vertically if desired. With this construction the blade can also be easily reversed, as both sides of the fastening block are formed to receive the shank.

The many and great advantages of this invention are obvious without further explanation, and it is also evident that various changes might be made in the forms, constructions and arrangements of the parts described without departing from the spirit and scope of my invention. Hence I do not wish to limit myself exactly to what is here shown and described, but consider myself entitled to all such changes as fall within the spirit and scope of my invention.

Having thus fully described my invention, what I claim as new, and desire to secure by Letters Patent of the United States, is—

1. The herein described reversible concavo-convex cultivator shovel formed of an elliptical plate twisted so that its similar opposite points are curved to project in opposite directions as shown and described, and fastening means located on the outer side of the shovel, as set forth.

2. The reversible cultivator shovel having the opposite points and the fastening plate centrally located on its rear side having a longitudinal socket extending through the plate, clamping means for securing the shank in said socket, said plate also having the rounded sides on opposite sides of said socket provided with openings to receive T shaped clamping bolts as and for the purposes set forth.

In testimony that I claim the foregoing as my own I affix my signature in presence of two witnesses.

BENJAMIN F. DARBY.

Witnesses:
J. W. DAWSON,
G. W. DAVID.